US007934252B2

(12) United States Patent
Chung et al.

(10) Patent No.: US 7,934,252 B2
(45) Date of Patent: Apr. 26, 2011

(54) FILTERING TECHNIQUE FOR PROCESSING SECURITY MEASURES IN WEB SERVICE MESSAGES

(75) Inventors: Hyen-Vui Chung, Round Rock, TX (US); Takahide Nogayama, Yamato (JP); Toshiro Takase, Yamato (JP); Kenichiro Ueno, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 923 days.

(21) Appl. No.: 11/771,350

(22) Filed: Jun. 29, 2007

(65) Prior Publication Data
US 2009/0007253 A1    Jan. 1, 2009

(51) Int. Cl.
*G06F 9/00* (2006.01)
(52) U.S. Cl. .............. 726/14; 726/11; 726/12; 713/151; 713/152; 713/153; 713/154; 709/202; 709/246; 717/136; 717/143
(58) Field of Classification Search .......... 713/151–154; 717/136, 143; 715/513
See application file for complete search history.

(56) References Cited

U.S. PATENT DOCUMENTS

| | | | | |
|---|---|---|---|---|
| 2004/0186989 | A1* | 9/2004 | Clapper | 713/151 |
| 2005/0097455 | A1* | 5/2005 | Zhou et al. | 715/513 |
| 2005/0273772 | A1* | 12/2005 | Matsakis et al. | 717/136 |
| 2006/0117307 | A1* | 6/2006 | Averbuch et al. | 717/143 |
| 2008/0235258 | A1* | 9/2008 | Chung et al. | 707/102 |

FOREIGN PATENT DOCUMENTS
WO    WO 03/073316    *  9/2003
* cited by examiner

*Primary Examiner* — Nabil M El Hady
(74) *Attorney, Agent, or Firm* — Cantor Colburn LLP; Stephen Kaufman (57) ABSTRACT

A message gateway apparatus is provided for use in a web service system to process a message containing a request for a destination web service application, in which the message includes a plurality of events within a structured document conforming to a web service protocol and each event of the plurality of events has a name and a content thereof. The message gateway apparatus comprises a message parsing module configured to sequentially identify the events of the plurality of events of the message, an input object creation module configured to sequentially extract the events of the plurality of events from the message parsing module, and a message filtering module configured to sequentially access the events of the plurality of events as the events are extracted from the message parsing module by the input object creation module to analyze the name of each event and perform security processing on the content of each event for which the corresponding name indicates that security measures have been applied according to a security protocol. The input object creation module is configured to construct an input object including input parameters for the destination web service application based on the message. The input object creation module constructing the input object by adding a representation of each event of the plurality of events to the input object after each event is accessed by the message filtering module.

20 Claims, 7 Drawing Sheets

FILTERING TECHNIQUE FOR PROCESSING SECURITY MEASURES IN WEB SERVICE MESSAGES

TRADEMARKS

IBM® is a registered trademark of International Business Machines Corporation, Armonk, N.Y., U.S.A. Other names used herein may be registered trademarks, trademarks, or product names of International Business Machines Corporation or other companies.

BACKGROUND OF THE INVENTION

1. Field of the Invention

This invention relates to processing web service messages, and particularly to techniques for efficiently processing security information in web service messages containing a requests for destination web service applications.

2. Description of Background

Web services are self-contained, self-describing, modular applications that can be described, located, and invoked over a computer network such as the World Wide Web. Web services utilize standardized interfaces and protocols (for example, a Web Application Programming Interface (API)) to implement integration methods that allow different entities or web-based applications to communicate data, logic, and processes with one another over a network. Furthermore, these standardized methods permit different applications to exchange resources with other entities or applications that are running on different operating systems.

Web services generally rely on open, industry standards that include, for example, XML (extensible markup language), SOAP, WSDL (Web service description language), and UDDI (universal description, discovery, and integration). XML provides a general, data model-oriented framework for the development and storage of application-specific languages and information that can be represented as a tree-based data structure. SOAP is an XML-based, extensible message envelope format that is used to transfer resources over particular transport protocols such as HTTP, SMTP, and FTP. A SOAP message (also referred to as a SOAP envelope) includes a header and a body of tagged data expressed as an XML listing. WSDL is used to describe what a web service offers, and UDDI is a registry listing available web services, which uses WSDL as a language.

As the use of web services has continued to increase, concerns regarding the integrity, confidentiality, and authenticity of transferred messages have led to the development and continuing evolution of security specifications for web services. WS-Security (Web Services Security) provides an evolving industry standard for securing a web service that defines a SOAP header element to carry security-related data. WS-Security specifies how one would embed the security information laid out by other specifications within a SOAP message, as well as how to attach security tokens. For instance, if XML Signature is used in a WS-Security header element, this header can contain the information defined by XML Signature that conveys how the message was signed, the key that was used, and the resulting signature value. Likewise, if an element within the body of the message is encrypted, the encryption information such as that conveyed by XML Encryption can be contained within the WS-Security header element.

Generally, upon receiving a web service message, an application will process the data using object-oriented APIs to create some form of internal representation of the message's contents. For example, XML parsers such as Document Object Model (DOM) and Simple API for XML (SAX) may be used to process XML listings. DOM parsers provide an interface-oriented API that allows for navigation of the entire document by transforming it into a tree structure of "node"-type objects and branches representing the document's contents. SAX parsers function as a streaming push parser with an event-driven API in which user defines a number of callback methods that will be called when events occur during parsing.

Tree-based parsers like DOM must read the entire document into memory before any processing can begin, so the amount of memory used by such a parser is a performance issue, particularly because an in-memory parse tree tends be several times larger than the document it models. For this reason, the inventors herein have recognized that using a tree-based parser for processing web service security information can be inefficient. For example, the processes of validating and canonicalizing XML messages both require inefficient traversing of the parse tree, and the process of decrypting messages requires the generation of a second parse tree for the decrypted data and discarding of the first parse tree for the pre-description data.

Event-based parsers like SAX are unidirectional; thus, previously parsed data cannot be read again without starting the parsing operation again. For this reason, the inventors herein have recognized that using an event-based parser for web service security processing can also be inefficient. For example, certain kinds of XML security processing may require information from any already-parsed part at any time in the parsed XML message, and the determination of the required part may be dictated by the content of a later event. In the case, the application would need to inefficiently record all of the previously parsed information.

SUMMARY OF THE INVENTION

The shortcomings of the prior art are overcome and additional advantages are provided through the provision of a message gateway apparatus for use in a web service system to process a message containing a request for a destination web service application, in which the message includes a plurality of events within a structured document conforming to a web service protocol and each event of the plurality of events has a name and a content thereof. The message gateway apparatus comprises a message parsing module configured to sequentially identify the events of the plurality of events of the message, an input object creation module configured to sequentially extract the events of the plurality of events from the message parsing module, and a message filtering module configured to sequentially access the events of the plurality of events as the events are extracted from the message parsing module by the input object creation module to analyze the name of each event and perform security processing on the content of each event for which the corresponding name indicates that security measures have been applied according to a security protocol. The input object creation module is configured to construct an input object including input parameters for the destination web service application based on the message. The input object creation module constructing the input object by adding a representation of each event of the plurality of events to the input object after each event is accessed by the message filtering module.

The shortcomings of the prior art are overcome and additional advantages are provided through the provision of a computer-implemented method for processing a message containing a request for a destination web service application, in which the message includes a plurality of events within a structured document conforming to a web service protocol and each event of the plurality of events has a name and a content thereof. The method comprises sequentially extracting the events of the plurality of events from the message. The method further comprises sequentially accessing the events of the plurality of events as the events are extracted to analyze the name of each event and perform security processing on the content of each event for which the corresponding name indicates that security measures have been applied according to a security protocol. The method further comprises constructing an input object including input parameters for the destination web service application based on the message by adding a representation of each event of the plurality of events to the input object after each event is accessed by the message filtering module. The method further comprises transmitting the input object to a web service application processing unit that performs processing for the destination web service.

Computer program products corresponding to the above-summarized method are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that can be implemented to more efficiently process security measures in a web service message containing a request for a destination web service application.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

DETAILED DESCRIPTION OF THE INVENTION

The following disclosure describes exemplary embodiments of filtering techniques and mechanisms for processing web service security measures contained in an incoming web service message received by a destination web service application server. In particular, the processing of the web service security measures is performed by a filtering module that sequentially pulls events from the web service message using a streaming pull parser. The following is intended to provide a detailed description of an exemplary embodiment of the invention and should not be taken to be limiting of the invention itself. Rather, any number of other embodiments may fall within the scope of the invention, which is defined in the claims following the description.

Figure 1:
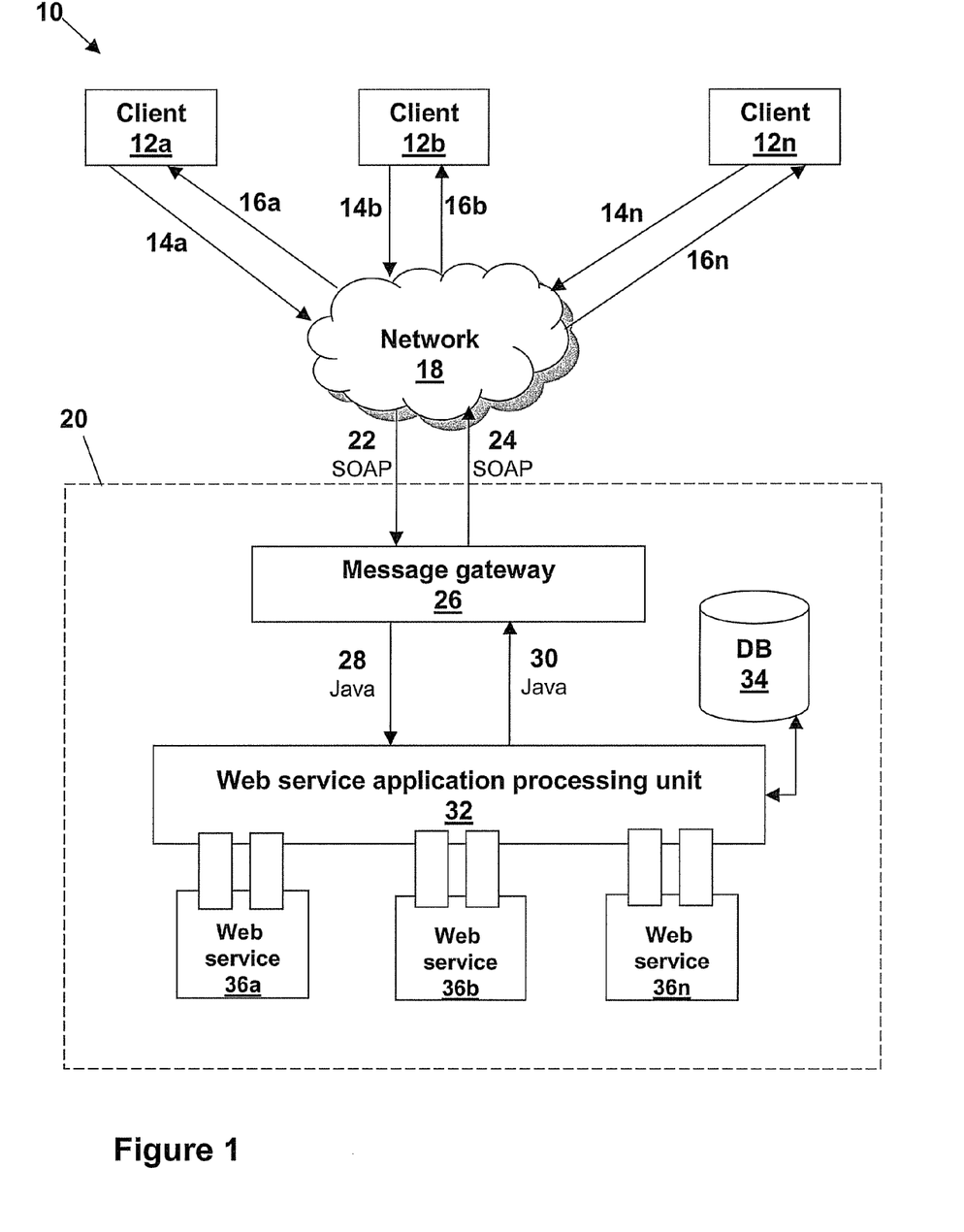
FIG. 1 is a schematic diagram that illustrates an operational configuration of a web service system in accordance with an exemplary embodiment of the present invention.

Turning now to the drawings in greater detail, FIG. 1 is a block diagram illustrating an exemplary web service system 10 in which exemplary embodiments of the present invention may be implemented and operate. Web service system 10 allows for the exchange or transport of web service data or web service messages over a communications network 18 between multiple web service client applications (12a, 12b-12n) to any of multiple web services (36a, 36b-36n) hosted by a web service application server or provider 20. Web services 36 may include some combination of programming and data that are made available through application server 20 for end users and other network-connected application programs.

When a client application needs to invoke a remote web service at application server 20, the invoking client application generates a request message in a web services protocol describing arguments to be given to the web services, and requests processing by the web services. Upon receiving the request message, application server 20 performs the processing for the requested web services, and returns a response message describing return values of the web services to the client application. In exemplary web service system 10, client applications 12a, 12b-12n respectively send web service request messages 14a, 14b-14n and receive web service response messages 16a, 16b-16n.

Client applications 12 are software applications that include one or more sequences of instructions that are executable by one or more processors. For example, applications 12 may be programs that are executable on a computer system such as the system illustrated in FIG. 7, described below. Client applications 12 are configured to transmit processing request messages 14 to application server 20 through network 18. Request messages 14 request that application server 20 perform processing for web services 36 provided by the application server. Client applications 12 are configured to thereafter receive, through network 18, processing response messages 16 transmitted by application server 20, which has performed the processing for the requested web services, and obtain results of the processing performed by the application server.

In exemplary embodiments, request messages 14 can have any structured framework for storing an amount of text or any data, the content of which can be defined as a particular structure. Some common web service communication protocols that may be employed for this purpose include SOAP and XML-RPC (extensible Markup Language-Remote Procedure Call). Both of these protocols allow remote procedure calls to be requested (and the results returned) using an XML-based data format. Request messages 14 may include invocations to URLs (Uniform Resource Locator) of web services and may include a request to access or receive data from the web services. Request messages 14 use one or more of several transportation protocols (i.e., HTTP, HTTPS, SMTP, XMPP, FTP, TCP, etc.) and are transferred over a particular transportation protocol layer. Request messages 14 may be sent directly through network 18 to application server 20 or may be routed through one or more intermediaries that may modify request messages 14 before they arrive at application server 20.

In exemplary embodiments described herein, request messages 14 are sent as XML element attributes or listings within SOAP envelopes that include a header and a body. SOAP defines an XML structure to call a method and pass parameter to that method, and also defines an XML structure for return values that were requested. The SOAP envelopes may further include (or may be modified before they arrive at application server 20 to include) web service messaging enhancements or layers. For example, the SOAP envelope may be secured using forms of security measures applied according to web service specifications such as, for example, WS-Security, WS-SecurityPolicy, WS-Trust, WS-Privacy, WS-Secure Conversion, WS-Federation, WS-Authorization, RPC Method Authorization, XML Encryption, XML Signature, XKMS, SAML, XACML, binary security tokens (such as assertions, X.509 certificates, Kerberos tickets, and encrypted keys), and combinations thereof, for enhancing the integrity, confidentiality, and authenticity of the message before it is received by a web service.

In exemplary embodiments described herein, the headers of the SOAP envelopes for request messages 14 include security features and information incorporated at the application layer according to the current and evolving specifications for WS-Security, which describe ways of applying XML Encryption, XML Signature, XML Canonicalization, security tokens, and other message integrity and confidentiality configurations to SOAP messages.

Response messages 16 may be returned and received by clients 12 as structured documents, such as XML documents. Response messages 16 may be implemented in SOAP envelopes received from application server 20. Response messages 16 use a particular transport protocol and are transferred over a particular transportation protocol layer. Response messages 16 may use the same transport protocol as request messages 14.

Client applications 12 and web services 36 communicate with each other, as well as with to other applications and web service systems, through network 18. Network 18 is configured to receive and pass on request response messages 14 and 16 accordingly, and to use the transportation protocol or protocols used by messages 14 and 16. Network 18 includes intranets, extranets, and the Internet, and may contain any number of network infrastructure elements including routers, switches, gateways, etc. For example, network 18 may be the public Internet or a private LAN.

Network 18 is connected to application server 20, which provides web services 36 to client applications 12 through the network. Network 18 passes each of request messages 14 as a request message 22 to and receives each of response messages 16 as a response message 24 from a web server application processing unit 32 within the application server through a message gateway 26 such as, for example, a firewall. Request message 22 includes a SOAP envelope carrying a request message sent by one of client applications 12 or by another client application, web service, or intermediary party. Response message 24 may include a SOAP envelope carrying a response message to be received by one of client applications 12.

Message gateway 26 receives request message 22 in the form of a SOAP envelope from network 18, and passes response message 24 to the network. Message gateway 26 serves as a SOAP processor that performs lexical analysis of the SOAP envelope of request message 22, using the contents of a plurality of web service specification events in the message syntax as inputs to create an input object 28 such as a Java object including parameters for invocation of one or more of web services 36 based on the result of the lexical analysis. Message gateway 26 sends input object 28 to web service application processing unit 32, which calls the appropriate web service(s) that correspond(s) the method invocation of the input object, executes the appropriate logic, and returns the result as an output object 30, such as a Java object that includes the return values of the invoked web service(s), to the message gateway. Message gateway 26 converts output object 30 into SOAP response message 24, and transmits the response message through network 18 to the invoking client application.

As illustrated FIG. 1, application processing unit 32 (such as WebSphere, a product of International Business Machines Corporation) oversees the execution of multiple web services 36a, 36b-36n that reside on application server 20. Application processing unit 32 is configured to perform processing for application server 20 based on input object 28 received from message gateway 26 and to return a result of the processing, as output object 30, to the message gateway. Application processing unit 32 may also be supported by a database management system 34, which may be any conventional data repository for storing, managing, and retrieving data. In exemplary embodiments, database 34 may be a relational or object-relational database management system, such as DB2, a product of International Business Machines Corporation.

In exemplary embodiments, database 34 may be internal to application server 20 (as shown in FIG. 1) or, alternatively, reside externally on a separate machine. In exemplary embodiments, application server 20 may use a single database 34 to serve multiple web services 36 (as illustrated in FIG. 1) or, alternatively, use a separate database for each separate web service.

Figure 2:
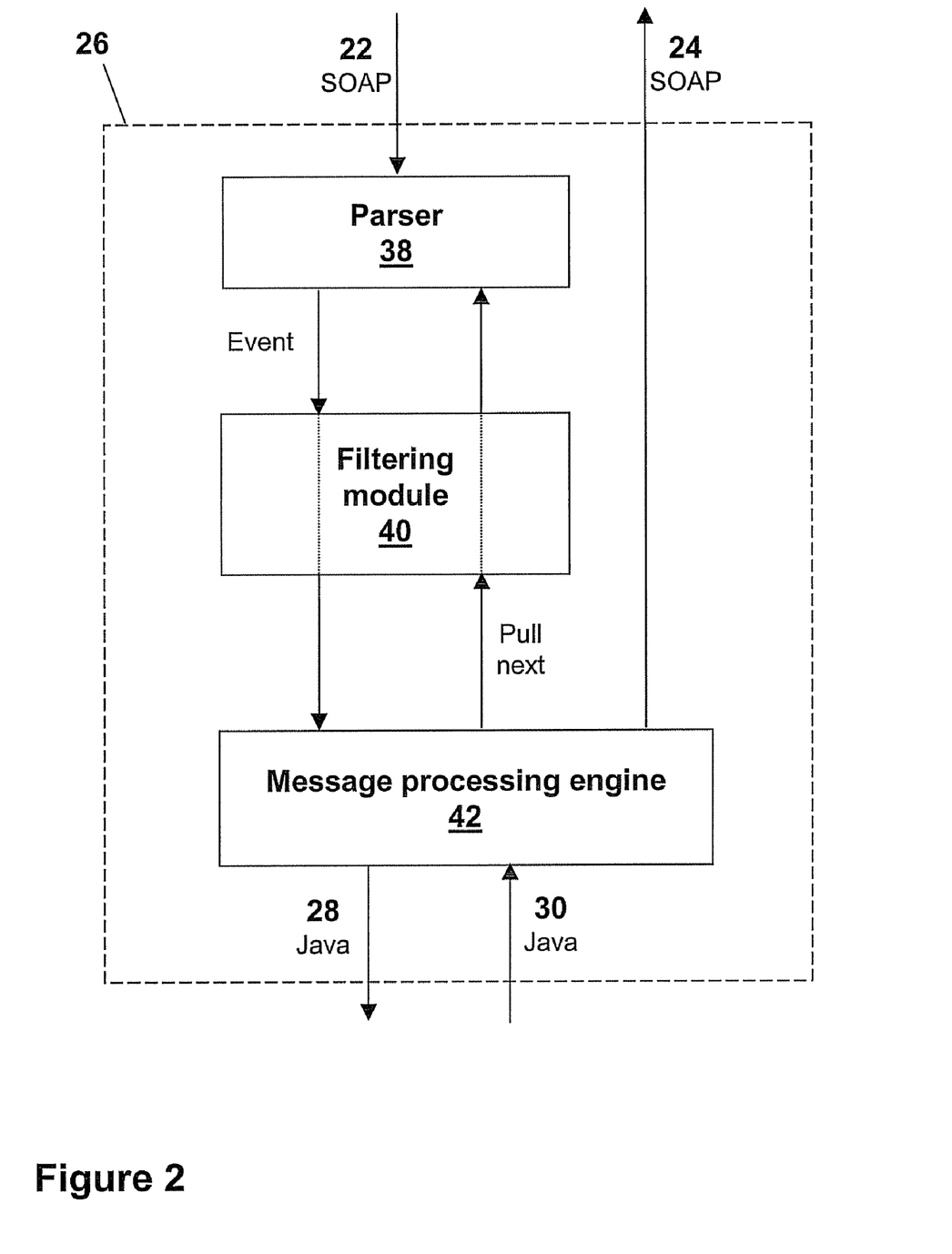
FIG. 2 is a schematic diagram that illustrates an operational configuration of a web service message gateway in accordance with an exemplary embodiment of the present invention.

Referring now to FIG. 2, a block diagram of an exemplary embodiment of message gateway 26 that includes a parser 38, a filtering module 40, and a message processing engine 42 is illustrated. Parser 38 is based upon on a streaming pull parsing API and thus has the ability to read arbitrarily large documents while leaving control to the pulling application (here, message processing engine 42). Filtering module 40 is configured to receive events included in an incoming request message 22 as they are sequentially pulled or extracted from parser 38 by message processing engine 42 before they are received by the message processing engine. Filtering module 40 identifies, extracts, and processes the contents of security-related events, then passes the contents of the each event as processed sequentially to message processing engine 42.

Message processing engine 42, which is a software application such as, for example, Apache Axis2, that knows how to handle SOAP requests and responses, is configured to create input object 28 based on the events pulled from filtering module 40, then send the input object, including parameters, to application processing unit 32 for execution of one or more of web services 36. Message processing engine 42 is also configured to receive output object 30 resulting from the web service processing by application processing unit 32 and convert the output object into a SOAP message to send as response message 24.

In the present exemplary embodiment, parser 38 is installed as a StAX (Streaming API for XML) parser, which is a streaming XML pull parsing API for reading and writing XML documents. By implementing parser 38 as a streaming pull parser, message gateway 26 is able to utilize filtering module 40 and StAX parser events to sequentially analyze and process the contents of security-related events included in incoming request message 22 before each event is loaded into message processing engine 42.

To enhance processing of request message 22, filtering module 40 includes one or more application-layer filter units that each performs processing on the contents of varying security-related event classes of the incoming request message. In the present exemplary embodiment, filtering module 40 examines the data contained in request message 22 and performs filtering decisions based upon WS-Security event information specified in SOAP header of the message. As illustrated in FIG. 2, as message processing engine 42 iterates through request message 22 by sequentially pulling events from parser 38, filtering module 40 tests each event, inspects its attributes, and, if a selected WS-Security security event is identified, processes the message using handlers that are responsible for acting on a header portion or a body portion (or both) of a SOAP message in a certain way. For example, filtering module 40 may include filter units in charge of recognizing WS-Security event specifications for XML Encryption, XML Signature, and XML Canonicalization, and corresponding handlers in charge of performing the appropriate integrity, authentication, and confidentiality processing on the appropriate part of request message 22 to prepare it for processing by web services 36.

As permitted, the processed event information, which may include parts that were modified by filtering module 40 during the WS-Security processing, may be built into input object 28 by message processing engine 42 as a parse tree structure representing the SOAP request message data as processed by the filtering module. By performing the security processing before building input object 28 as described, message gateway 26 can allow for more efficient message processing. For example, by processing the complex functionality implemented by security specifications such as XML Signature and XML Canonicalization using pulled StAX events in filtering module 40 prior to generating a parse tree for the data in message processing engine 42, the present exemplary embodiment avoids inefficient parse tree traversing steps within message processing engine 42 that would otherwise occur during WS-Security processing. As another example, by performing decryption using StAX events in filtering module 40 prior to generating input object 28 in message processing engine 42, the present exemplary embodiment avoids the inefficient processing steps of generating a first parse tree representing the pre-decryption data, decrypting the data parse tree to form a second parse representing the decrypted data, and discarding the pre-decryption parse tree.

Figure 3:
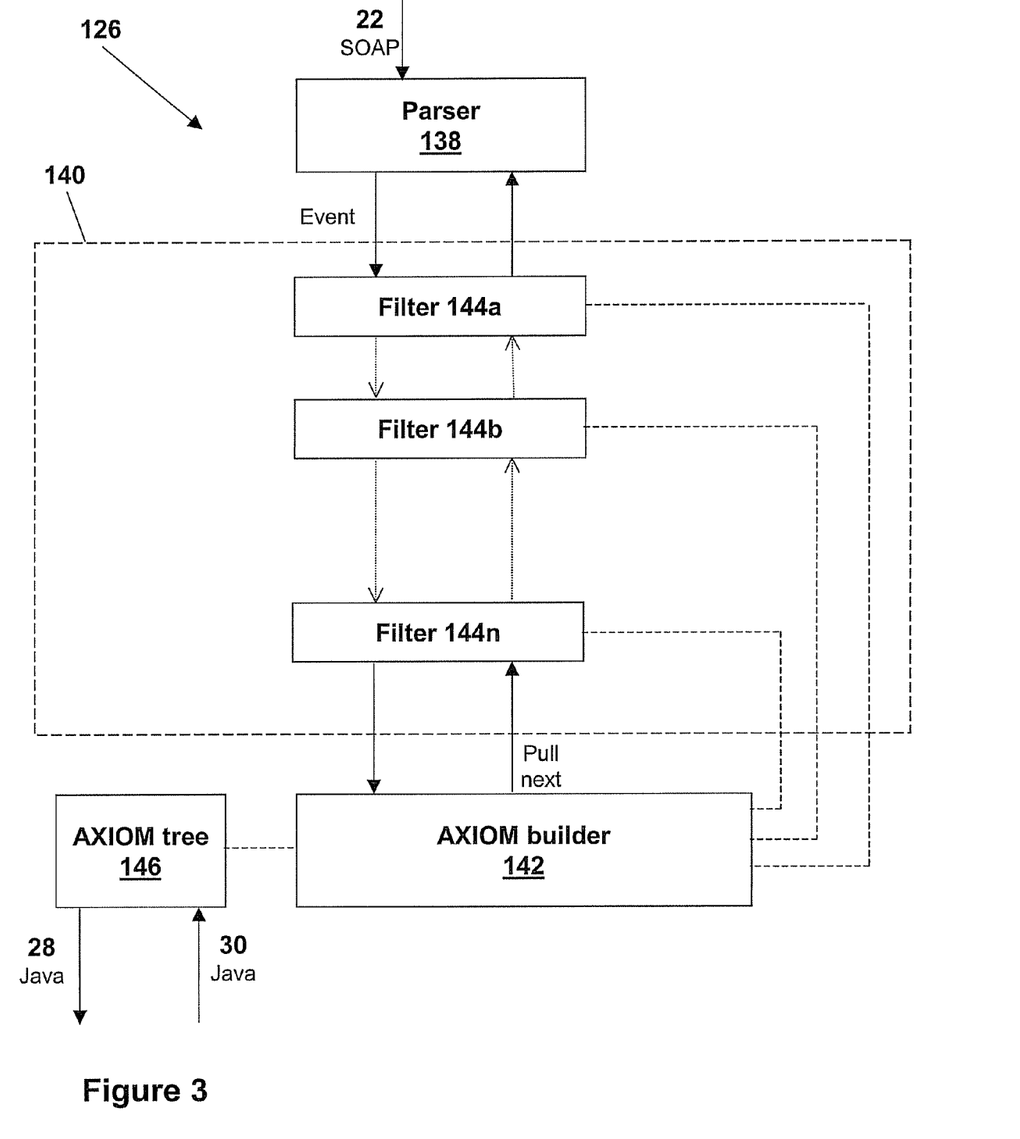
FIG. 3 is a schematic diagram that illustrates another configuration of a web service message gateway in accordance with an exemplary embodiment of the present invention.

Referring now to FIG. 3, a block diagram of an exemplary embodiment of a message gateway that can be installed in exemplary application server 20 in FIG. 2 is illustrated. In this example, message gateway 126 includes a filtering module 140 having a pipeline of multiple filter units 144a, 144b-144n and an AXIOM (AXIs Object Model) builder 142 after the last stage of the pipeline. AXIOM builder 142, which can be implemented within an Apache Axis2 message processing engine, is thus the ultimate receiver of parser events. Filtering module 140 and AXIOM builder 142 are in communication with a StAX parser 138 in the same manner as filtering module 40 and message processing unit 42, as described above with respect to the exemplary embodiment shown in FIG. 2. The use of a streaming pull parser such as StAX parser 138 permits the chaining of the output one filter unit to the input of the next, as depicted in FIG. 3.

Because filter units 144a, 144b-144n operate as event-level filters that are each specific to one security-related event or a subset of security-related events, each filter unit may not have an overall document view and may not know what to expect to grow as child nodes. In addition, because parser 138 is a streaming parser, filter units 144a, 144b-144n may not get events that have already been pulled by AXIOM builder 142 once before. In many instances, however, a handler function within one of the filter units may require information about a part of an event that has already passed through filtering module 140, and further, the determination of which part and/or event the required information will come from may depend on the content of a later event. Thus, filtering module 140 should provide a way of providing information from prior events as a message is being processed by filter units 144a, 144b-144n.

In the present exemplary embodiment, each filter unit is provided with a reference to AXIOM builder 142, as indicated by dashed lines in FIG. 3. AXIOM builder 142 incrementally builds input object 28 for request message 22 in memory within AXIOM tree 146, but will not create the entire object model at once. Rather, AXIOM builder 142 only builds when the relevant information is absolutely required, thereby incrementally building AXIOM tree 146. This deferred construction allows for referencing of AXIOM builder 142 for one part of AXIOM tree 146 even while other parts of the input object tree remain incomplete. Because each of filter units 144a, 144b-144n has a reference to AXIOM builder 142, each filter unit can access the latest version of AXIOM tree 146 under construction. Thus, the present exemplary embodiment avoids the inefficient processing that would result by having each filter separately record the information in earlier parts. Rather, filter units 144a, 144b-144n can directly reference AXIOM builder 142 to get information from former parts.

An example of a process that may utilize filtering module 140 and AXIOM builder 142 of the present exemplary embodiment is the process of building a namespace mapping to obtain the namespace declarations for data that has been decrypted within one or more of filter units 144a, 144b-144n. Namespaces allow the use of multiple schema definitions within a structured document by building a grammar from several different schemas and providing a way to resolve name conflicts between the schemas. For XML documents, namespaces are referred to using a mapping from an abbreviated namespace prefix to the full namespace URI. The namespace prefix is convenient for representing the namespace, but is meaningful only within the document that defines that mapping. It is the namespace URI that defines the global meaning. Therefore, the concept of a namespace prefix is not meaningful for raw data that has been decrypted within the streaming flow of filtering module 140, because the raw decrypted byte sequence does not have the XMLNS mapping of the prefixes to namespace URIs as declared by the decrypted data's ancestors. Thus, the namespace declarations of each decrypted part's ancestors should be gathered so that the each decrypted part can be wrapped with a dummy element that provides the corresponding prefix to namespace URI mapping.

For example, because XML Encryption allows for encryption of any arbitrary element or data within an XML document, filtering module 140 does not know in advance which parts of inbound request message 22 are encrypted. Thus, if WS-Security processing were performed within separate filter units 144a, 144b-144n without the references to AXIOM builder 142, each filter unit would need to record all of the namespace declarations in the message as it is parsed. In the present exemplary embodiment, however, because each filter unit has a reference to AXIOM builder 142, namespace declarations can be gathered if and only if encrypted parts are encountered.

Figure 4:
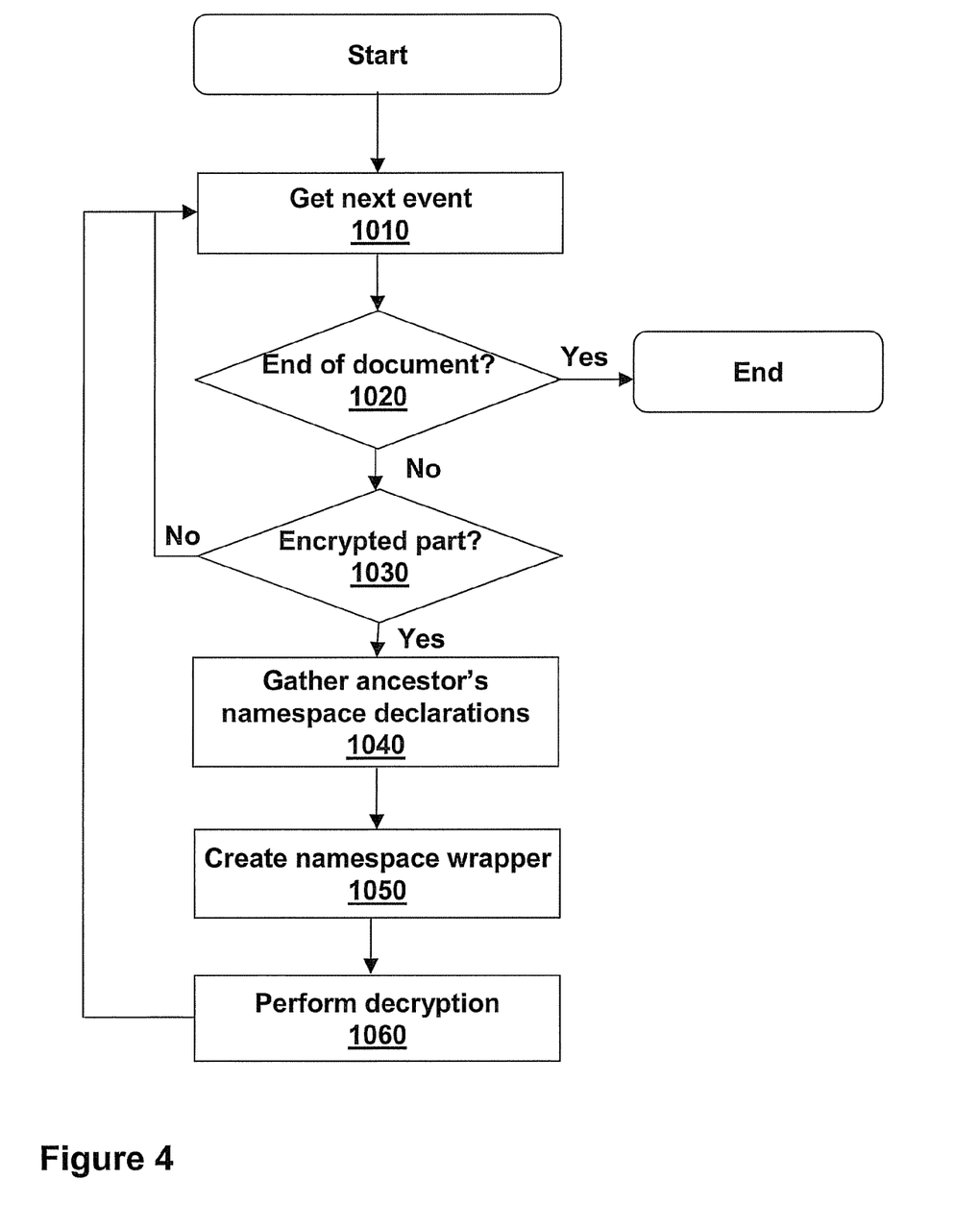
FIG. 4 is a flow diagram that provides a method of processing security information in a web service message using the web service message gateway illustrated in FIG. 3 in accordance with an exemplary embodiment of the present invention.

FIG. 4 provides a flow diagram illustrating an exemplary embodiment of this process of gathering namespaces during WS-Security processing using the exemplary configuration provided in FIG. 3. The process can be implemented using message gateway 126. At step 1010, AXIOM builder 142 pulls, and filtering module 140 gets, the next event from parser 138 (for instance, by calling the next( ) function of the StAX API). If the next event is the end of the document, the process ends at step 1020. Otherwise, the process proceeds to step 1030, at which it is determined whether an encrypted part is referred to in the current event (for instance, by calling the getLocalName( ) and getNamespaceURI( ) function of the StAX API). If an encrypted part is not encountered in the current event, the process returns to step 1010 and repeats, pulling the next event from parser 138.

If an encrypted part is encountered at step 1030, filtering module 140 initiates the process of gathering the namespace declarations of the part's ancestors at step 1040 by referencing AXIOM builder 142, which locates the encrypted part's ancestor in AXIOM tree 146. At step 1050, AXIOM builder 142 creates and returns a dummy element that provides the prefix to namespace URI mapping declared by the part's ancestor. The encrypted part is then decrypted at step 1060 in one or more of filter units 144a, 144b-144n and wrapped with the dummy element returned by AXIOM builder 142. The process then returns to step 1010 and repeats, pulling the next event from parser 38. Because process steps 1040-1060 are only executed for encrypted parts, and because storing the ancestor of an encrypted part in AXIOM builder 142 takes less memory than storing all declared namespaces, the exemplary process illustrated in FIG. 4 can avoid the inefficient recording of all the namespace declarations in one or more of filter units 144a, 144b-144n.

Figure 5:
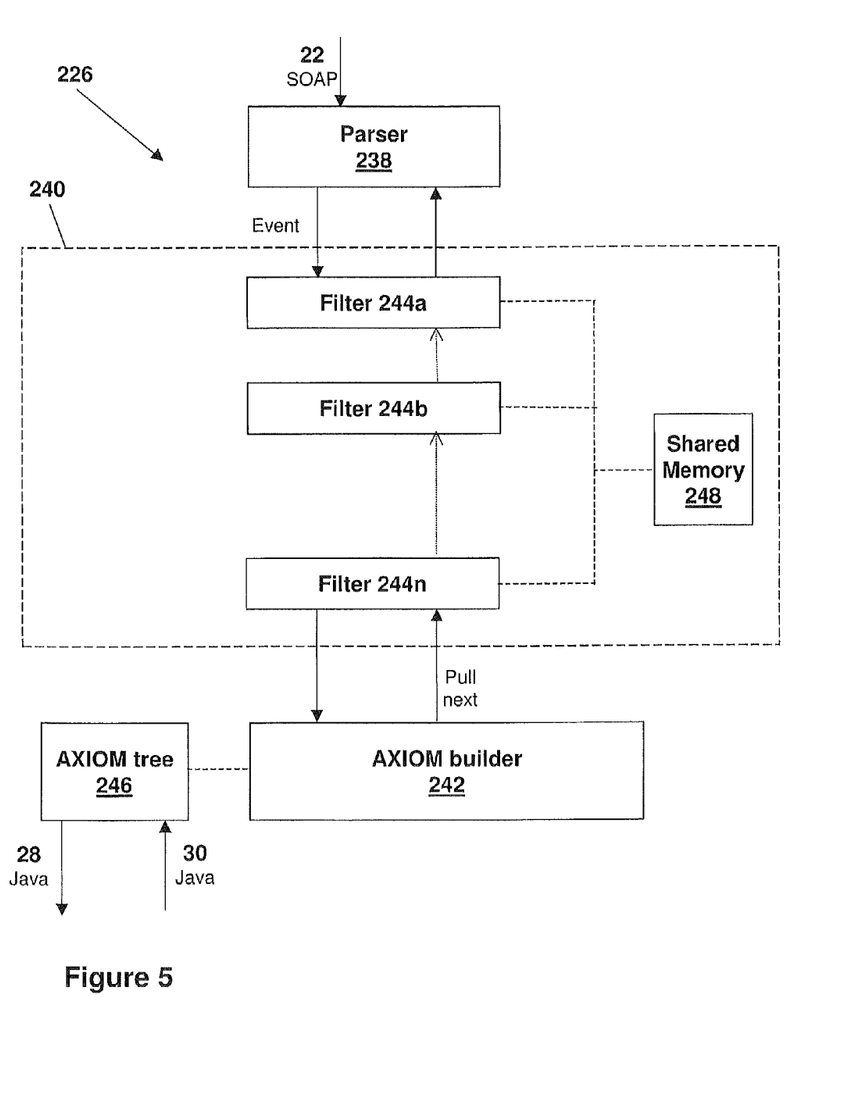
FIG. 5 is a schematic diagram that illustrates another configuration of a web service message gateway in accordance with an exemplary embodiment of the present invention.

Referring now to FIG. 5, a block diagram of another exemplary embodiment of a message gateway that can be installed in exemplary application server of 20 in FIG. 2 is illustrated. Message gateway 226 includes filtering module 240 having a pipeline of multiple filters 244a, 244b-244n, an AXIOM builder 242 after the last stage of the pipeline (filter 244n), and a shared memory component 248 for temporarily sharing data that can be referenced by each of the multiple filters, as indicated by dashed lines. As with message gateway 126 shown in FIG. 3, AXIOM builder 242 is the ultimate receiver of parser events, and filtering module 240 and AXIOM builder 242 are in communication with a StAX parser 238 in the same manner as filtering module 40 and message processing unit 42 as described above with respect to the exemplary embodiment shown in FIG. 2. The use of a streaming pull parser such as StAX parser 238 permits the chaining of the output of one filter to the input of the next. Shared data can, for example, be declared as a global variable at shared memory component 248 that is accessible by all filters 244a, 244b-244n.

In the present exemplary embodiment, shared memory component 248 stores the information of the current event pulled from parser 238. Because the information of shared memory component 248 is shared by each of filters 244a, 244b-244n, the overlapping of multiple filters to realize complicated functions can be avoided. Moreover, the overhead of an invocation for each event in each filter can be avoided because each filter does not have to get the information of the current event for itself.

Figure 6:
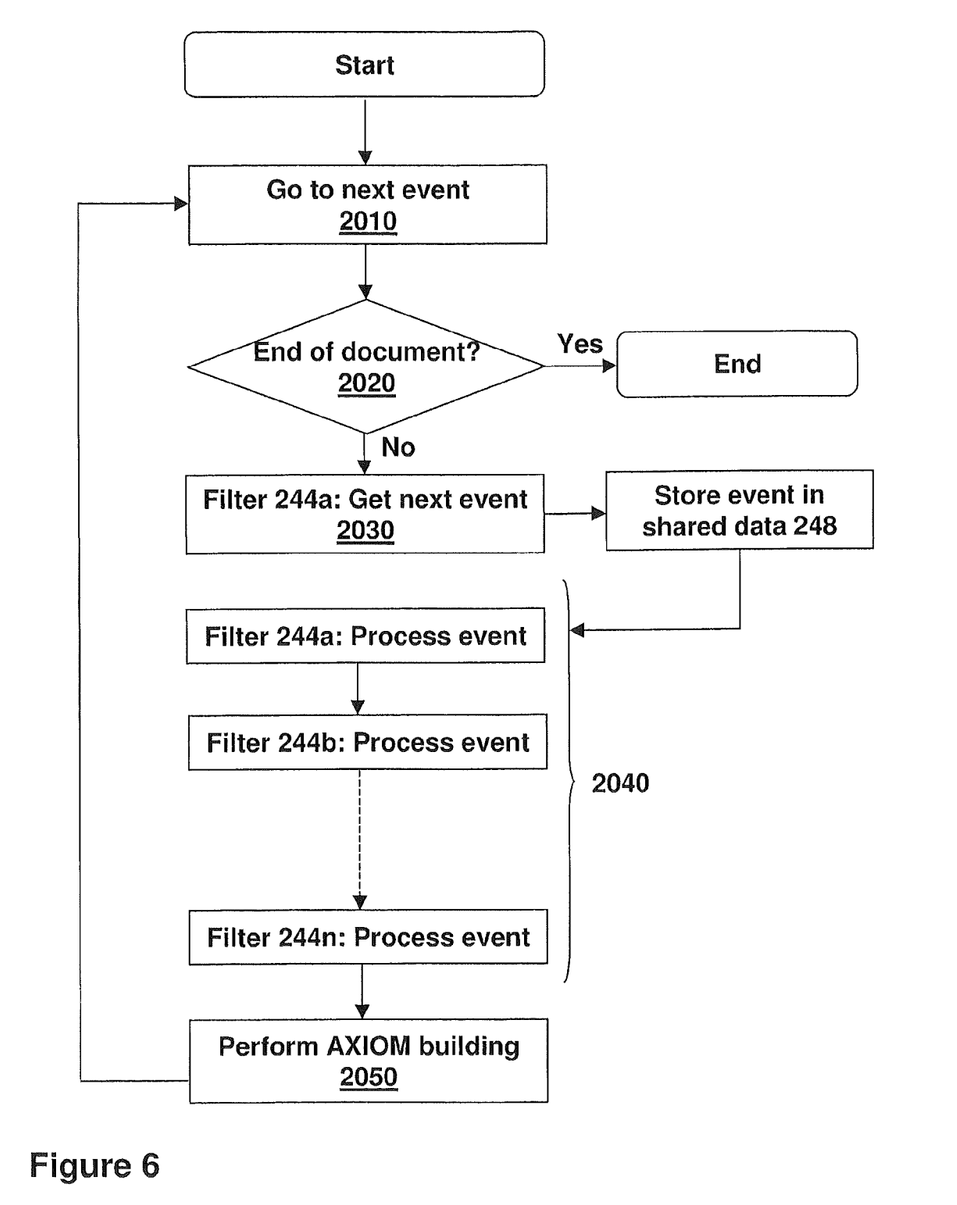
FIG. 6 is a flow diagram that provides a method of processing security information in a web service message using the web service message gateway illustrated in FIG. 5 in accordance with an exemplary embodiment of the present invention.

The event processing of the exemplary embodiment illustrated in FIG. 5 is shown in the flow diagram of FIG. 6. At step 2010, AXIOM builder 242 pulls and filtering module 240 gets the next event from parser 238. If next event is the end of the document, the process ends at step 2020. Otherwise, the process proceeds to step 2030, at which filter 244a gets the information of the current event and stores the information into shared memory component 248. The current event information is then shared among all filters 244a, 244b-244n so that each filter does not need to pull the information of the current event from parser 238. At step 2040, filters 244a, 244b-244n process the current event by reading and writing to the shared event information in shared memory component 248. Thus, the overhead of only one invocation for the information of each event is needed among all filters 244a, 244b-244n, as if the filters were a single filter, during processing. At step 2050, AXIOM builder 242, which is the ultimate receiver of the events from parser 38, gets the information of the events from filter 244n. The information returned by filter 244n is the event information from shared memory component 248. In this way, AXIOM builder 242 only needs to access filter 244n to get the information of each event.

The capabilities of exemplary embodiments of present invention described above can be implemented in software, firmware, hardware, or some combination thereof, and may be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. Exemplary embodiments of the present invention can also be embedded in a computer program product, which comprises features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Therefore, one or more aspects of exemplary embodiments of the present invention can be included in an article of manufacture (for example, one or more computer program products) having, for instance, computer usable media. The media has embodied therein, for instance, computer readable program code means for providing and facilitating the capabilities of the present invention. The article of manufacture can be included as a part of a computer system or sold separately. Furthermore, at least one program storage device readable by a machine, tangibly embodying at least one program of instructions executable by the machine to perform the capabilities of the exemplary embodiments of the present invention described above can be provided. To illustrate, FIG. 7 shows a block diagram of an exemplary embodiment of a hardware configuration for a computer system, representing web service application server 20 in FIG. 1, through which exemplary embodiments of the present invention can be implemented.

Figure 7:
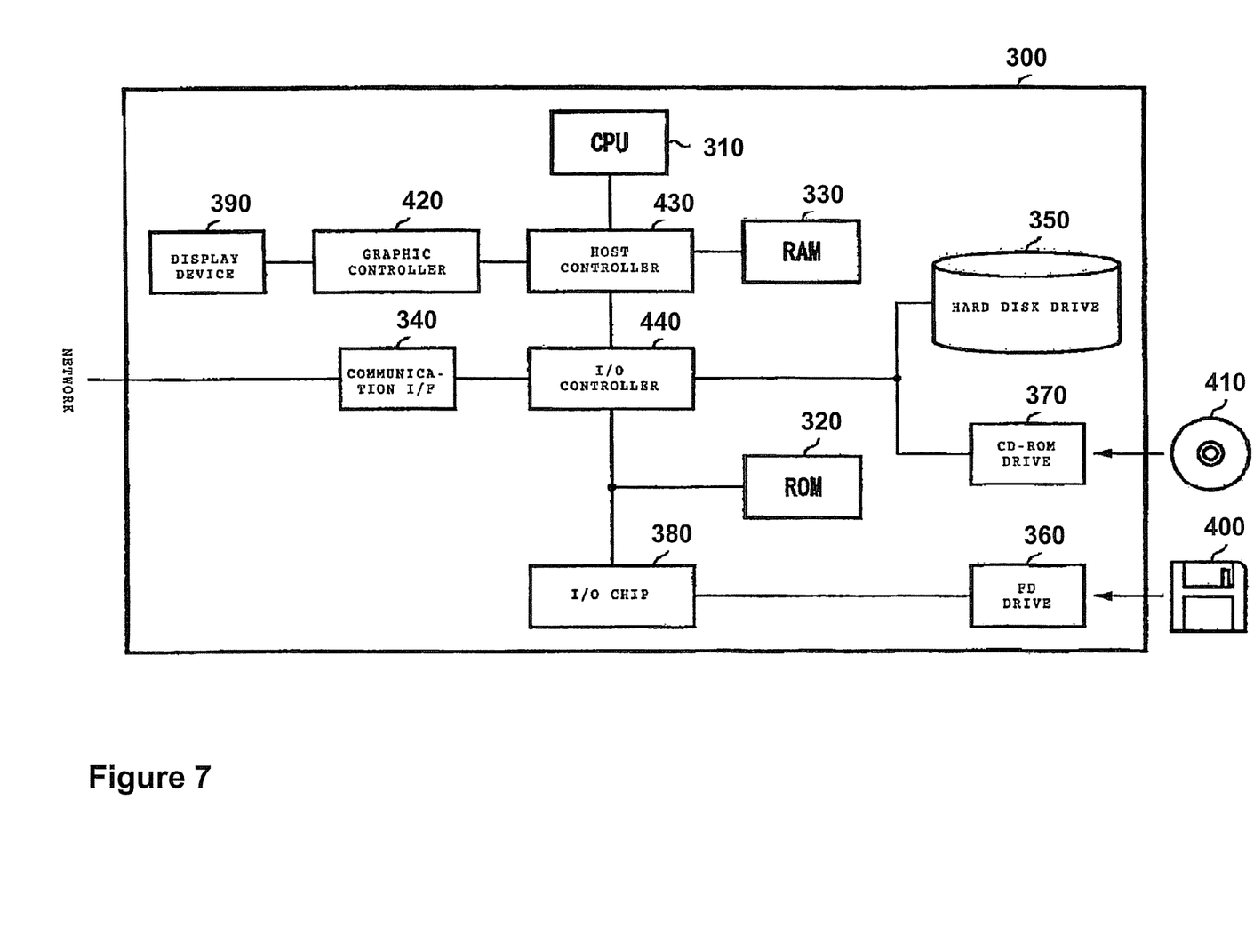
FIG. 7 is a schematic diagram that illustrates a hardware configuration of computer system for a web service application server in accordance with exemplary embodiments of the present invention.

As illustrated in FIG. 7, computer system 300 includes: a CPU peripheral part having a CPU 310 that accesses a RAM 330 at a high transfer rate, a display device 390, and a graphic controller 420, all of which are connected to each other by a host controller 430; an input/output part having a communication interface 340, a hard disk drive 350, and a CD-ROM drive 370, all of which are connected to host controller 430 by an input/output controller 440; and a legacy input/output part having a ROM 320, a flexible disk drive 360, and an input/output chip 380, all of which are connected to input/output controller 440.

Host controller 430 connects RAM 330, CPU 310, and graphic controller 420 to each other. CPU 310 operates based on programs stored in ROM 320 and RAM 330, and controls the respective parts. Graphic controller 420 obtains image data created on a frame buffer provided in RAM 330 by CPU 310 and the like, and displays the data on the display device 390. Alternatively, graphic controller 420 may include a frame buffer which stores image data created by CPU 310 and the like therein.

Input/output controller 440 connects host controller 430 to communication interface 340, hard disk drive 350, and CD-ROM drive 370, which are relatively high-speed input/output devices. Communication interface 340 communicates with other devices through the network. Hard disk drive 350 stores programs and data which are used by CPU 310 in computer 300. CD-ROM drive 370 reads programs or data from CD-ROM 410 and provides the programs or the data to hard disk drive 350 through RAM 330.

Moreover, ROM 320, flexible disk drive 360, and input/output chip 380, which are relatively low-speed input/output devices, are connected to input/output controller 440. ROM 320 stores a boot program executed by computer 300 at its start, a program dependent on the hardware of the computer, and the like. Flexible disk drive 360 reads programs or data from flexible disk 400 and provides the programs or the data to hard disk drive 350 through RAM 330. Input/output chip 380 connects the various input/output devices to each other through flexible disk drive 360 and, for example, a parallel port, a serial port, a keyboard port, a mouse port and the like.

The programs provided to hard disk drive 350 through RAM 330 are stored in a recording medium such as flexible disk 400, CD-ROM 410, or an IC card. Thus, the programs are provided by a user. The programs are read from the recording medium, installed into hard disk drive 350 in computer 300 through RAM 330, and executed in CPU 310.

A program which is installed into computer 300 and allows the computer to function as web service application server 20 includes a message parsing module, a message filtering module for security processing, a message processing module, and a web service application processing module. The above-described program or modules work on CPU 310 and the like and allow computer 300 to function as parser 38, filtering module 40 or 140 or 240, message processing engine 42 or an AXIOM builder, and application processing unit 44, respectively.

The above-described program or modules may be stored in an external storage medium. In addition to flexible disk 400 and CD-ROM 410, an optical recording medium such as a DVD and a PD, a magneto-optical recording medium such as a MD, a tape medium, a semiconductor memory such as an IC card, and the like may be used as the storage medium. Moreover, the program may be provided to computer 300 through the network by using, as the recording medium, a storage device such as a hard disk or a RAM, which is provided in a server system connected to a dedicated communication network or the Internet.

Although the preferred embodiment of the present invention has been described in detail, it should be understood that various changes, substitutions, and alternations can be made therein without departing from spirit and scope of the inventions as defined by the appended claims.

Although exemplary embodiments of the present invention have been described in detail, it should be understood that various changes, substitutions and alternations can be made therein without departing from spirit and scope of the inventions as defined by the appended claims. For example, it may be desirable to combine the functionality of exemplary filtering module 140 described with reference to FIG. 3 with that of exemplary filtering module 240 described with reference to FIG. 5.

Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

While exemplary embodiments of the present invention have been described, it will be understood that those skilled in the art, both now and in the future, may make various modifications without departing from the spirit and the scope of the present invention as set forth in the following claims. These following claims should be construed to maintain the proper protection for the present invention.

What is claimed is:

1. A message gateway apparatus for use in a web service system to process a message containing a request for a destination web service application, the message including a plurality of events within a structured document conforming to a web service protocol, each event of the plurality of events having a name and a content thereof, the message gateway apparatus comprising:
   a shared memory component;
   a message parsing module configured to sequentially identify the events of the plurality of events of the message;
   an input object creation module configured to sequentially extract the events of the plurality of events from the message parsing module; and
   a message filtering module communicatively coupled to the shared memory component and configured to sequentially access the events of the plurality of events as the events are extracted from the message parsing module by the input object creation module to analyze the name of each event and perform security processing on the content of each event for which the corresponding name indicates that security measures have been applied according to a security protocol,
   wherein the input object creation module is configured to construct an input object including input parameters for the destination web service application based on the message, the input object creation module constructing the input object by adding a representation of each event of the plurality of events to the input object after each event is accessed by the message filtering module.

2. The message gateway apparatus of claim 1, wherein the message filtering module includes a plurality of filtering units, each filtering unit being configured to analyze the name of each event and perform a selected security processing function on the content of each event for which the corresponding name indicates that security measures calling for the selected security processing function have been applied.

3. The message gateway apparatus of claim 2, wherein each filtering unit of the plurality of filtering units includes a reference to the input object creation module for accessing the input object to obtain data corresponding to information from the representations of the events that have been added to the input object.

4. The message gateway apparatus of claim 3, wherein a first selected security processing function of a first filtering unit of the plurality filtering units is configured to use the reference of the first filtering unit to access the input object and obtain a first data element corresponding to a set of information called for by the first selected security processing function.

5. The message gateway apparatus of claim 4, wherein the set of information called for by the first selected security processing function is determined by the content of each event processed by the first selected security processing function.

6. The message gateway apparatus of claim 2, further comprising a shared memory component being configured to store a temporary representation of an event, each filtering unit of the plurality of filtering units including a reference to the shared memory component for accessing the temporary representation to perform security processing on the content of the temporary representation of the event stored in the shared memory component.

7. The message gateway apparatus of claim 6, wherein the plurality of filtering units includes a first filtering unit configured to write the temporary representation of each event of the plurality of events to the shared memory component when each event is extracted from the message parsing module, and wherein the plurality of filtering units includes a second filtering unit configured to provide the temporary representation stored in the shared memory component to the input object creation module after each event is accessed by the filtering module.

8. The message gateway apparatus of claim 7, wherein each filtering unit of the plurality of filtering units includes a reference to the input object creation module for accessing the input object to obtain data corresponding to information from the representations of the events that have been added to the input object.

9. The message gateway apparatus of claim 8, wherein the message parsing module is implemented as a StAX-based parser.

10. The message gateway apparatus of claim 9, wherein the web service protocol is SOAP, and wherein the request is expressed as an XML listing in a SOAP envelope having a header section and a body section.

11. The message gateway apparatus of claim 10, wherein the security protocol is WS-Security, and wherein the header section of the SOAP envelope contains information about security measures have been applied to the message.

12. The message gateway apparatus of claim 11, wherein the input object creation module is implemented using Apache Axis, wherein the input object is constructed as a Java object, and wherein the input object creation module is configured to transmit the Java object to a web service application processing unit that performs processing for the destination web service.

13. The message gateway apparatus of claim 12, wherein the input object creation module is implemented as an AXIOM builder module configured to incrementally construct the input object in a parse tree structure.

14. The message gateway apparatus of claim 11, wherein XML Encryption security measures have been applied to the message, wherein a WS-Security header element within the header section of the SOAP envelope contains confidentiality security constraints and binding information as defined according to XML Encryption specifications, and wherein the plurality of filtering units includes one or more filtering units configured to perform security processing on the content of each event for which the corresponding name indicates that XML Encryption security measures have been applied.

15. The message gateway apparatus of claim 11, wherein XML Signature security measures have been applied to the message, wherein a WS-Security header element within the header section of the SOAP envelope contains integrity security constraints and binding information as defined according to XML Signature specifications, and wherein the plurality of filtering units includes one or more filtering units configured to perform security processing on the content of each event for which the corresponding name indicates that XML Signature security measures have been applied.

16. The message gateway apparatus of claim 15, wherein XML Canonicalization security measures have been applied to the message, wherein the WS-Security header element contains transformation constraints and binding information as defined according to XML Canonicalization specifications, and wherein the plurality of filtering units includes one or more filtering units configured to perform security processing on the content of each event for which the corresponding name indicates that XML Canonicalization security measures have been applied.

17. The message gateway apparatus of claim 14, wherein the one or more filtering units are configured to perform decryption on a part of the content of each event for which the corresponding name indicates that XML Encryption security measures have been applied, and wherein the one or more filtering units includes a first filtering unit configured to perform a processing function that uses the reference of the first filtering unit to access the input object and obtain a data element corresponding to a mapping of the namespace URIs assigned to prefixes as declared by an ancestor of the decrypted part.

18. A computer-implemented method for processing a message containing a request for a destination web service application, the message including a plurality of events within a structured document conforming to a web service protocol, each event of the plurality of events having a name and a content thereof, the method comprising:

sequentially extracting the events of the plurality of events from the message;

sequentially accessing the events of the plurality of events as the events are extracted to analyze the name of each event and perform security processing on the content of each event for which the corresponding name indicates that security measures have been applied according to a security protocol;

constructing an input object including input parameters for the destination web service application based on the message by adding a representation of each event of the plurality of events to the input object after each event is accessed by the message filtering module; and transmitting the input object to a web service application processing unit that performs processing for the destination web service.

19. A computer-usable storage medium having computer readable instructions stored thereon for execution by a processor to perform a method for processing a message containing a request for a destination web service application, the message including a plurality of events within a structured document conforming to a web service protocol, each event of the plurality of events having a name and a content thereof, the method comprising:

sequentially extracting the events of the plurality of events from the message;

sequentially accessing the events of the plurality of events as the events are extracted to analyze the name of each event and perform security processing on the content of each event for which the corresponding name indicates that security measures have been applied according to a security protocol;

constructing an input object including input parameters for the destination web service application based on the message by adding a representation of each event of the plurality of events to the input object after each event is accessed by the message filtering module; and transmitting the input object to a web service application processing unit configured to perform processing for the destination web service.

20. An article of manufacture comprising one of hardware logic implementing logic and a computer readable storage medium including a program for processing a message containing a request for a destination web service application, the message including a plurality of events within a structured document conforming to a web service protocol, each event of the plurality of events having a name and a content thereof, wherein the logic or program causes operations to be performed, the operations comprising:

sequentially extracting the events of the plurality of events from the message;

sequentially accessing the events of the plurality of events as the events are extracted to analyze the name of each event and perform security processing on the content of each event for which the corresponding name indicates that security measures have been applied according to a security protocol;

constructing an input object including input parameters for the destination web service application based on the message by adding a representation of each event of the plurality of events to the input object after each event is accessed by the message filtering module; and transmitting the input object to a web service application processing unit configured to perform processing for the destination web service.

* * * * *